(12) United States Patent
Freeman et al.

(10) Patent No.: US 7,664,720 B1
(45) Date of Patent: Feb. 16, 2010

(54) METHOD AND PRODUCT OF MANUFACTURE FOR THE RECOMMENDATION OF OPTIMIZERS IN A GRAPHICAL USER INTERFACE FOR MATHEMATICAL SOLVERS

(75) Inventors: Mary Ann Branch Freeman, Holliston, MA (US); Marcelo Marazzi, Cambridge, MA (US); Marjorie Berman, Newton, MA (US); Rakesh Kumar, Framingham, MA (US); Tara Scott, Millis, MA (US); Amy Kidd, Framingham, MA (US)

(73) Assignee: The MathWorks, Inc., Natick, MA (US)

( * ) Notice: Subject to any disclaimer, the term of this patent is extended or adjusted under 35 U.S.C. 154(b) by 574 days.

(21) Appl. No.: 11/652,262

(22) Filed: Jan. 10, 2007

(51) Int. Cl.
*G06N 5/00* (2006.01)
(52) U.S. Cl. .......................................... 706/45; 706/13
(58) Field of Classification Search ................... 706/13, 706/45, 47; 707/9; 705/1
See application file for complete search history.

(56) References Cited

U.S. PATENT DOCUMENTS 6,112,181 A * 8/2000 Shear et al. ..................... 705/1
6,138,119 A * 10/2000 Hall et al. ....................... 707/9

OTHER PUBLICATIONS

Lysiak, et al., A generalized MATLAB-based Distributed-computing Optimization Tool, Wireless Communications and Applied Computational Electromagnetics, 2005, IEEE/ACES International Conference on, Apr. 3-7, 2005, pp. 170-173.*

* cited by examiner

*Primary Examiner*—Wilbert L Starks, Jr.
(74) *Attorney, Agent, or Firm*—Lahive & Cockfield, LLP; Kevin J. Canning

(57) ABSTRACT

In one embodiment, a method of providing a graphical user interface (GUI) for a plurality of optimization solvers is provided. The method includes providing the GUI for the plurality of optimization solvers, the GUI including a control to select a solver from the plurality of solvers; receiving a selection of a first solver from the plurality of optimization solvers; and displaying in the GUI contents tailored to the first solver, the GUI contents including an objective function, wherein the objective function is in an expression in an array-based language.

55 Claims, 8 Drawing Sheets

METHOD AND PRODUCT OF MANUFACTURE FOR THE RECOMMENDATION OF OPTIMIZERS IN A GRAPHICAL USER INTERFACE FOR MATHEMATICAL SOLVERS

BACKGROUND OF THE INVENTION

MATLAB® software is a product of The MathWorks, Inc. of Natick, Mass., which provides engineers, scientists, mathematicians, and educators across a diverse range of industries with an environment for technical computing applications. As a desktop application, MATLAB software allows scientists and engineers to interactively perform complex analysis and modeling in their familiar workstation environment. The MATLAB software includes multiple toolboxes containing different mathematical solvers, where the different toolboxes may be purchased separately by a user. The toolboxes attempt to group related solvers. Thus, for example, a Signal Processing Toolbox may contain solvers that are useful for signal processing. In another example, in the Genetic Algorithm and Direct Search Toolbox, there is a genetic algorithm solver called ga and a pattern search solver called patternsearch.

A graphical user interface is sometimes provided to utilize a solver in the MATLAB environment instead of just a command line interface. For example, ga solver and patternsearch solver each have their own graphical user interface that may be used by a user instead of a command line interface using the commands gatool and psearchtool respectively. A graphical user interface can relieve a user from learning and remembering certain commands that are required to use a solver.

SUMMARY OF THE INVENTION

In one embodiment, a method of providing a graphical user interface (GUI) for a plurality of optimization solvers is provided. The method includes providing the GUI for the plurality of optimization solvers, the GUI including a control to select a solver from the plurality of optimization solvers; receiving a selection of a first solver from the plurality of optimization solvers; and displaying in the GUI contents tailored to the first solver, the GUI contents including an objective function, wherein the objective function is in an expression in an array-based language.

In another embodiment, a computing device-implemented method of providing a GUI for a plurality of mathematical solvers is provided. The method includes providing the GUI in a single window for the plurality of mathematical solvers, the GUI including a control to select a solver from the plurality of mathematical solvers; receiving a selection of a first solver from the plurality of mathematical solvers; and displaying in the GUI contents tailored to the first solver.

In yet another embodiment, a computing device-implemented method of assisting a user to select a solver from a plurality of optimization solvers is provided. The method includes obtaining information regarding a type of an objective function, a type of constraint, a type of variables, or a number of variables; and recommending a solver from the plurality of optimization solvers for the user to select.

In another embodiment, a system of providing a graphical user interface for a plurality of solvers of the same type is provided. The system includes an application that has the plurality of solvers, and a graphical user interface for the plurality of solvers, the GUI includes a control to select a solver from the plurality of solvers, wherein the GUI contents are updated according to a selected solver from the plurality of solvers.

In still another embodiment, a medium storing executable instructions for causing a computing device to provide a graphical user interface for a plurality of optimization solvers is provided. The instructions include instruction for providing a GUI for the plurality of optimization solvers, the GUI including a control to select a solver from the plurality of optimization solvers; receiving a selection of a first solver from the plurality of optimization solvers, and displaying in the GUI contents tailored to the first solver, the GUI contents including an objective function, wherein the objective function is in an expression in an array-based language.

In yet another embodiment, a medium storing executable instructions for causing a computing device to provide a GUI for a plurality of mathematical solvers is provided. The medium includes instructions for providing the GUI in a single window for the plurality of mathematical solvers, the GUI including a control to select a solver from the plurality of mathematical solvers; the instructions for receiving a selection of a first solver from the plurality of mathematical solvers; and instructions for displaying in the GUI contents tailored to the first solver.

In still another embodiment, a medium storing executable instructions for causing a computing device to assist a user to select a solver from a plurality of optimization solvers is provided. The medium includes instructions for obtaining information regarding a type of an objective function, a type of constraint, a type of variables, or a number of variables; and instructions for recommending a solver from the plurality of optimization solvers for the user to select.

In still another embodiment, a system of providing a GUI for a plurality of mathematical solvers is provided. The system includes means for providing the GUI in a single window for the plurality of mathematical solvers, the GUI including a control to select a solver from the plurality of mathematical solvers, means for receiving a selection of a first solver from the plurality of mathematical solvers, and means for displaying in the GUI contents tailored to the first solver.

In yet another embodiment, a method for a computing device to distribute to a remote computing device a plurality of instructions is provided. The method includes receiving a request from the remote computing device for the plurality of instructions, wherein the plurality of instructions comprising the instructions for providing the GUI in a single window for the plurality of mathematical solvers, the GUI including a control to select a solver from the plurality of mathematical solvers, instructions for receiving a selection of a first solver from the plurality of mathematical solvers, and instructions for displaying in the GUI contents tailored to the first solver, and forwarding the plurality of instructions to the remote computing device.

BRIEF DESCRIPTION OF THE FIGURES

The foregoing and other embodiments, features, and advantages of the invention will become more apparent and may be better understood by referring to the following description taken in conjunction with the accompanying drawings, in which.

DETAILED DESCRIPTION

Figure 1A:
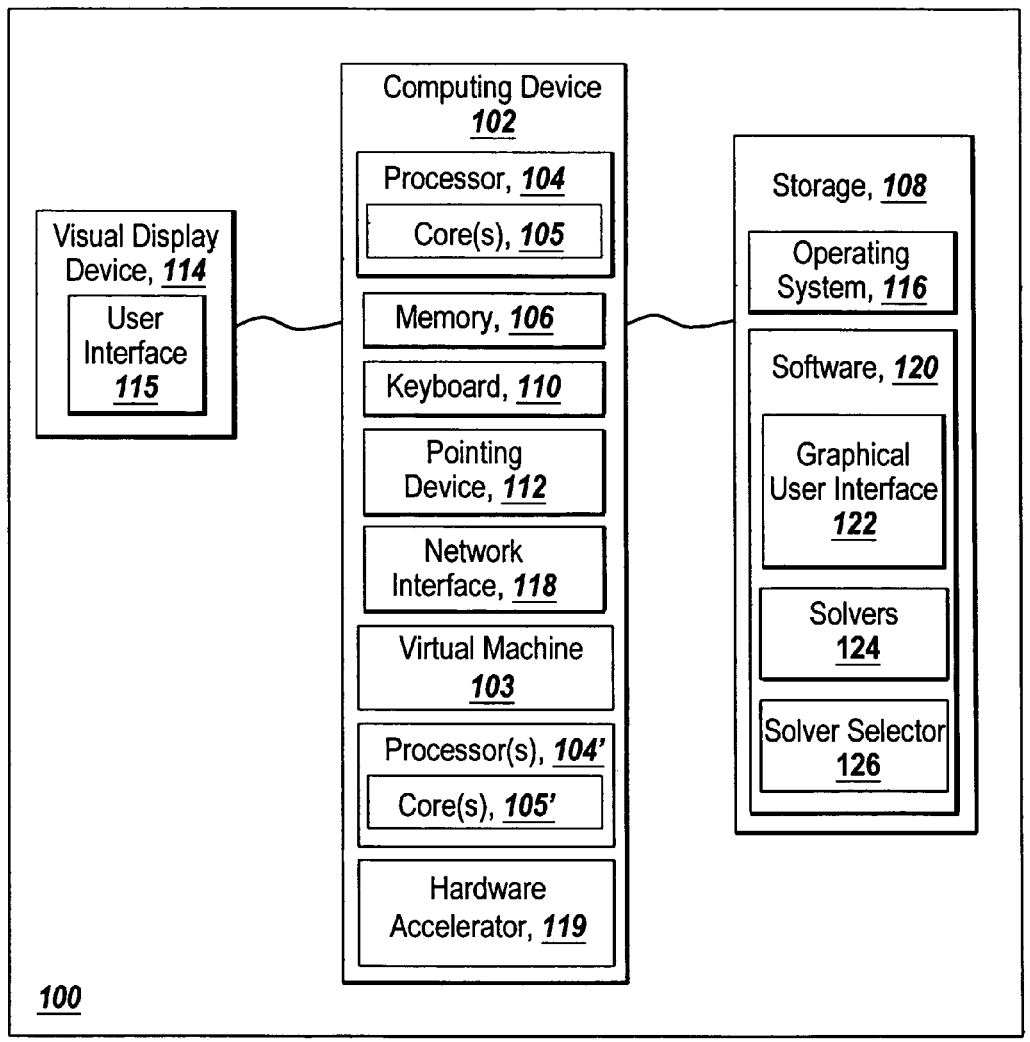
FIG. 1A is a block diagram of a computing device suitable for practicing an embodiment of the present invention.

Some exemplary embodiments described herein provide systems and methods for providing a GUI for multiple solvers, such as for solvers of the same type. Two different solvers are of the same type if their use is for a same general purpose, such as, optimization, data analysis, fuzzy logic, signal processing, and bioinformatics, etc. In one embodiment, instead of providing self-contained solvers with their own separate GUIs, multiple solvers share the same GUI.

The GUI provides a control for a user to choose a solver from a list of available solvers. Once the solver is chosen, the contents of the GUI are updated accordingly to show features and options related to the chosen solver. Hence, a user can see how the solver options change as different solvers are selected in the GUI. The GUI exposes the relationship between the solvers and the solver options. In one embodiment, a GUI widget for selecting a solver and one or more widgets for solver options are simultaneously visible/active in a single window. Hence, a user does not need to switch between windows to change a solver he/she wants to use or to review solver options. In one embodiment, the choosing of solvers and options is a primary application of the GUI.

In another embodiment, one or more widgets in the GUI may be included in a window that may be docked or undocked from a container window. The container window may include multiple windows, such as a first window for solver selections and results, a second window for options related to a chosen solver, and a third window for help topics related to the chosen solver and options. A window may have a control that allows the window to be docked or undocked from a container window. In one embodiment, to dock a window in a container window, the window is dragged into the container window and the container window may provide one or more locations where the window may be incorporated in the container window. In one embodiment, to undock a window in the container window, a control may be used to separate the window from the container window. In one embodiment, when one or more windows are undocked from the container window, the container window and the one or more windows stay visible simultaneously.

In one embodiment, default options and values may be shown explicitly. Alternatively, a user may choose to provide custom values and/or select an option value other than the default option value. A solver selector may be provided to assist a user to choose the most suitable solver to solve a specific problem. Different export options may be provided so that the problem and options setup may be exported to a desired format.

Exemplary embodiments are described for illustrative purposes relative to a MATLAB-compatible technical computing environment that provides mathematical tools for solving problems. A MATLAB-compatible modeling environment capable of executing a MATLAB expression, function, and/or files. For example, a MATLAB-compatible technical environment may provide ability to interface with a MATLAB expression, function, and/or file (i.e. M-file or MAT-file), ability to import or export a MATLAB expression, function, and/or file, means for converting a MATLAB expression, function, and/or file, or ability to integrate a MATLAB expression, function, and/or file, etc. Although exemplary embodiments may be described relative to a MATLAB-compatible technical computing environment, the present invention is not limited to these embodiments and may be applied to modeling and/or computing tasks via other computing environments.

Some computing environments or languages used in them may be, but are not limited to, array-based. An array-based language may have functions adapted to handling array data types. An example of an array-based language is a language of MATLAB® computing environment or a language having a subset of instructions, which are executable in the MATLAB® computing environment. In an alternative embodiment, a computing environment may interpret or execute a dynamically typed language.

Examples of some of the computing environments that may be suitable to practice with the present invention include, but are not limited to, ones from software products of Mathematica® from Wolfram Research, Inc., Mathcad of Mathsoft Engineering & Education Inc., Maple™ from Maplesoft, a division of Waterloo Maple Inc, Scilab™ from The French National Institution for Research in Computer Science and Control (INRIA), or COMSOL Script™ from COMSOL AB. In yet another embodiment of the invention, a computing environment may be a graphical modeling environment.

FIG. 1A depicts an environment 100 suitable for practicing an exemplary embodiment of the present invention. Computing device 102 includes memory 106, on which software according to one embodiment of the present invention may be stored, processor 104, and optionally, one or more processor(s) 104' for executing software stored in the memory 106, and other programs for controlling system hardware. Processor 104 and processor(s) 104' can each be a single core or multiple core (105 and 105') processor.

The memory 106 may include among other things a computer system memory or random access memory (RAM), such as dynamic random access memory (DRAM), static random access memory (SRAM), Magnetoresistive Random Access Memory (MRAM), extended data out random access memory (EDO RAM), etc. A user may interact with the computing device 102 through a keyboard 110, a pointing device 112, and/or a visual display device 114 such as a computer monitor, which may include a user interface 115. Other input devices, such as accelerometer and gyroscope based input devices, active whiteboards, neuro interface devices, screen readers, or voice recognition software, may also be used with computing device 102. The computing device 102 may further include a storage device 108, such as a hard-drive, compact disc-read-only memory (CD-ROM), or other computer readable medium, for storing an operating system 116 and other related software, and for storing software 120, such as a MATLAB programming environment.

Software 120 can include solvers 124 and a graphical user interface (GUI) 122 for using the solvers 124. Software 120 may further include a solver selector 126 that assists a user to choose a solver from solvers 124 and select or setup the appropriate solver options. One of ordinary skill in the art will appreciate that solvers 124, graphical user interface 122, and solver selector 126 can be adapted to be included as part of the software 120, or they each can be a stand-alone application, module, script, program, or plug-in that responds to calls from the software 120. Additionally, the operating system 116 and software 120 can be run from a computer readable medium, such as, for example, KNOPPIX®, a bootable CD for GNU/Linux.

Additionally, the computing device 102 may include a network interface 118 to interface to a Local Area Network (LAN), Wide Area Network (WAN) or the Internet through a variety of connection types including, but not limited to, standard telephone lines, LAN or WAN links (e.g., IEEE 802.11, IEEE 802.16, T1, T3, 56 kb, X.25), broadband connections (e.g., Integrated Services Digital Network (ISDN), Frame Relay, asynchronous transfer mode (ATM)), wireless connections (e.g., Bluetooth), etc., or some combination of any or all of the above.

The network interface 118 may include a built-in network adapter, network interface card (NIC), Personal Computer Memory Card International Association (PCMCIA) network card, wireless network adapter, Universal Serial Bus (USB) network adapter, modem or any other device suitable for interfacing the computing device 102 to any type of network capable of communication and performing operations described herein. Moreover, the computing device 102 may be any computer device and/or system, such as a workstation, desktop computer, server, laptop, handheld computer or other form of computing or telecommunications device that is capable of communication with another device/system and that has sufficient processor power and/or memory to perform the operations described herein.

The computing device 102 can be running substantially any operating system such as a version of the Microsoft® Windows® operating systems, Unix operating system, Linux operating systems, MacOS® operating system, etc. Implementations of computing device 102 may further operate an embedded operating system, a real-time operating system, an open source operating system, a proprietary operating system, an operating system for mobile computing devices, and/or another type of operating system capable of running on computing device 102 and/or performing the operations described herein.

Virtualization may be employed in computing device 102. Virtualized processors may also be used with modeling/programming environment 120 and/or other software in storage 108. A virtual machine 103 can be provided to handle a process running on multiple processors so that the process appears to be using only one computing resource rather than multiple computing resources. Multiple virtual machines can also be used with one processor. Other computing resources, such as Field Programming Gate Array (FPGA), Application Specific Integrated Circuit (ASIC), Application Specific Instruction-set Processor (ASIP), Digital Signal Processor (DSP), Graphical Processing Unit (GPU), and General Purpose Processor (GPP), may also be used for executing code and/or software. A hardware accelerator 119, such as implemented in an ASIC, FPGA, or the like, can additionally be used to increase a processing rate of the computing device 102.

Figure 1B:
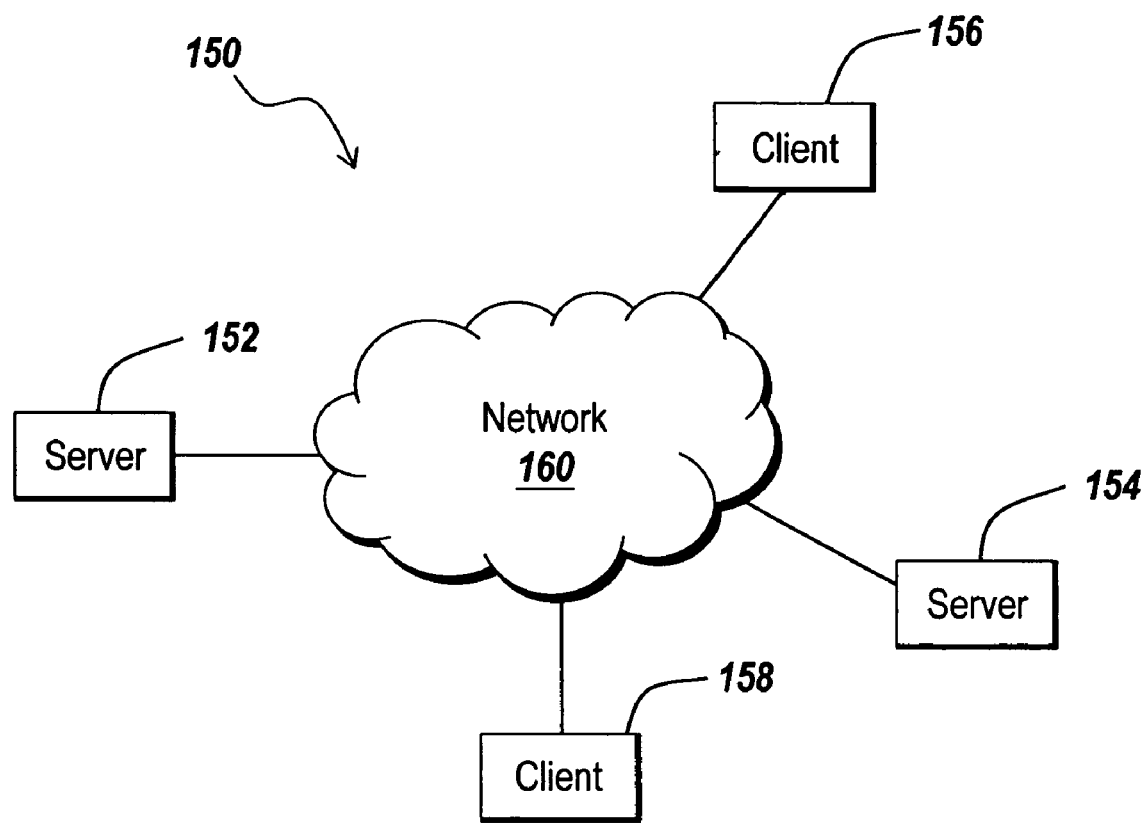
FIG. 1B depicts an exemplary distributed system suitable for practicing a distributed implementation of an illustrative embodiment.

FIG. 1B is an exemplary network environment 150 suitable for the distributed implementation of an illustrative embodiment. The network environment 150 may include one or more servers 152 and 154 coupled to clients 156 and 158 via a communication network 160. In one implementation, the servers 152 and 154 and/or the clients 156 and/or 158 can be implemented via the computing device 102. A network interface of the computing device 102 enables the servers 152 and 154 to communicate with the clients 156 and 158 through the communication network 160.

Implementations of network 160 may include an intranet, LAN, WAN, Metropolitan Area Network (MAN), or the Internet through a variety of connection types including, but not limited to, standard telephone lines, LAN or WAN links, broadband connections, wireless connections, etc., or some combination of any or all of the above. In addition the network 160 may use middleware, such as Common Object Request Broker Architecture (CORBA) or Distributed Component Object Model (DCOM) to allow a computing device on the network 160 to communicate directly with another computing device that is connected to the network 160.

Figure 2:
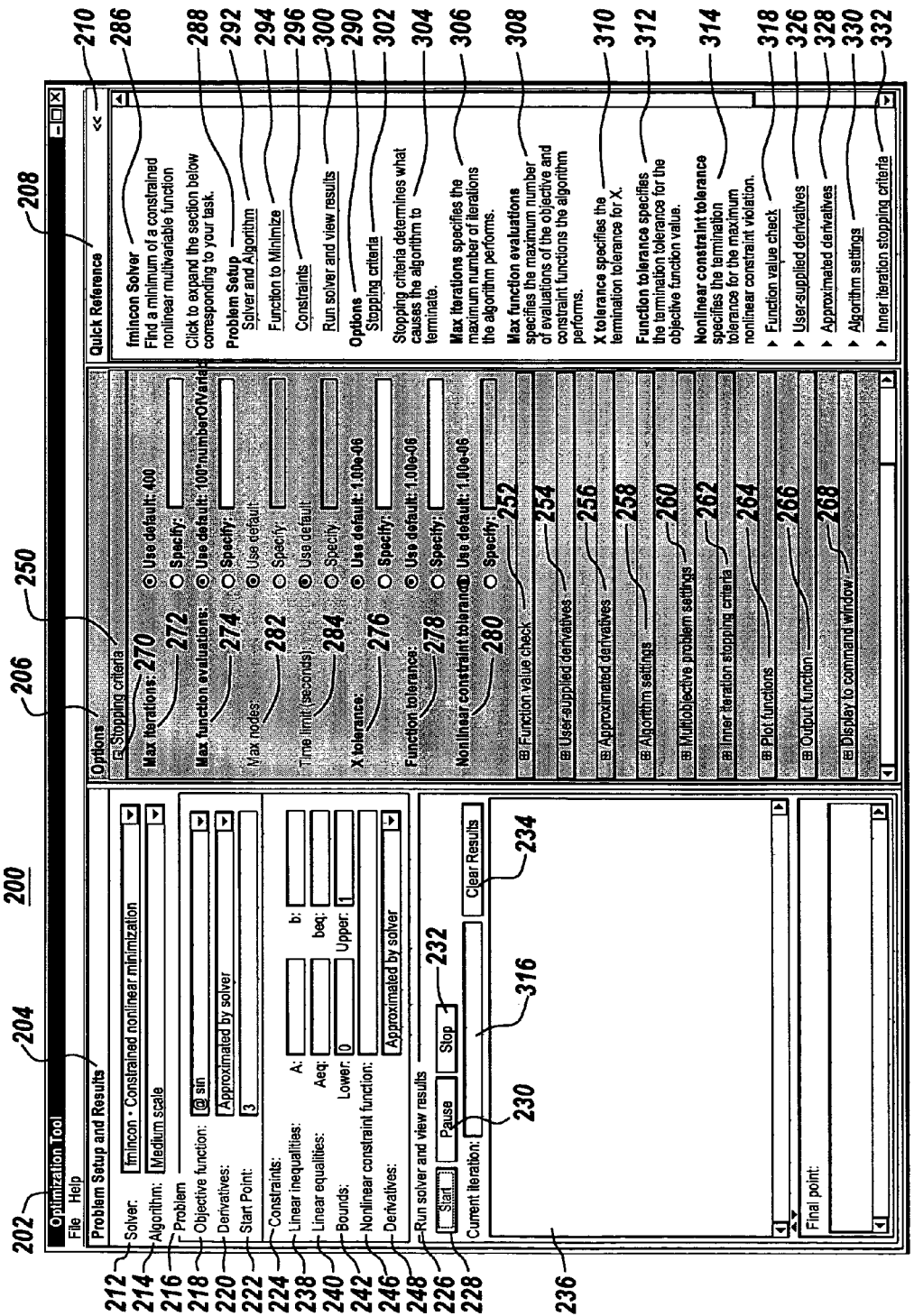
FIG. 2 is an exemplary graphical user interface that is suitable to practice one embodiment of the present invention.

FIG. 2 illustrates an exemplary GUI 200 that is suitable to practice one embodiment of the present invention. It should be appreciated that other GUIs may be used and that the depicted GUI is merely illustrative. GUI 200 may be implemented using various programming languages including, but not limited to, JAVA programming language, a HTML programming language, an XML programming language, a JavaScript programming language, MATLAB M programming language, and programming languages developed for web browser technology, such as, for example, FLASH. GUI 200 is contained within window 202. Window 202 includes three vertical panes oriented side by side: pane 204, pane 206, and pane 208.

Alternatively, windows may be used instead of panes 204, 206, and 208 so that the windows may be individually docked in a container window or undocked from the container window. In one embodiment, contents in panes 204, 206, or 208 may be in a container window (without using a pane) while all other contents may be in one or more windows. In another embodiment, a combination of panes and windows may be used in the GUI 200.

Icon 210 is provided at one end of the window 202 and allows a user to hide pane 208 by selecting and activating the icon 210. Pane 204 displays problem setup (e.g., problem specification fields) and results. Pane 204 includes a solver section 212. The solver section 212 can include a drop-down list for a user to choose a solver. The drop-down list may give the solver name as well as additional text to aid the user in choosing a solver. Each solver listed in the drop-down list in solver section 212 has a license associated with the toolbox that the solver is in so that the solver may be used with GUI 200. Alternatively, solver section 212 can include a button for a user to find a desired solver in storage 108. Solver section 212 may provide a GUI widget that allows a user to type in the name of the solver. Solver section 212 can provide many different kinds of GUI widgets that may be used for a user to select a solver, and the specific examples listed herein should not be used to limit the scope of the present invention.

Depending on the solver selected in the solver section 212, the contents of the GUI 200 can be updated accordingly. A mapping between contents and solvers may be used to indicate contents that are available for each solver so that software 120 knows what relevant contents to display in GUI 200. In FIG. 2, an optimization solver called fmincon solver is selected in solver section 212. For fmincon solver, there is an option to choose a desired algorithm to use with the solver in algorithm field 214. In one embodiment, solvers of the same type, such as optimization solvers, may share the same GUI. In one embodiment, a solver provided in the solver section 212 is implemented in a technical computing environment. In another embodiment, a solver may be provided by a third party that does not provide GUI 200. In still another embodiment, a solver may be obtained remotely from another computing device (i.e., the solver is not installed in the computing device that displays GUI 200 to a user).

For each solver that can be selected from solver section 212, a problem section 216 may be provided. The problem section 216 is a section for a user to specify a problem the user would like to use a selected solver from the solver section 212 to solve. The contents of the problem section may vary depending on the solver selected in solver section 212.

For fmincon solver, problem section 216 may include an objective function field 218, a derivatives field 220, and a start point field 222. The objective function field 218 is a place for a user to enter a function that a selected solver from solver section 212 would operate on. In FIG. 2, objective function field 218 has a value of "@ sin", which is a function handle in the MATLAB programming language. Additional details of a function handle can be found at U.S. Pat. No. 6,857,118, which is incorporated herein by reference. One of ordinary skill in the art will appreciate that the present invention is not limited to use a function handle in an objective function field, and other formats, such as, for example, a function from an equation editor or a string indicating the name of a function, may also be accepted by the objective function field.

The derivative field 220 is for a user to choose how the derivative of the function specified in the objective function field 218 is computed or approximated. In FIG. 2, the user chooses to have the fmincon solver selected in solver section 212 to approximate the derivative in field 218. The start point field 222 provides the user to specify an initial value (scalar, vector, or matrix) for the algorithm used by the solver specified in the solver section 212.

For the fmincon solver, there may further be a constraint section 224 that can have linear inequalities field 238, linear equalities field 240, bounds field 242, nonlinear constraint function field 246, derivatives field 248. The linear inequalities field 238 allows a user to specify a matrix A and a vector b so that for solution x, the constraint $A*x \leq b$ is satisfied within a constraint tolerance. As for linear equalities field 240, a user is allowed to specify a matrix Aeq and vector beq so that for solution x, the constraint $Aeq*x=beq$ is satisfied within a constraint tolerance.

Bounds field 242 are the lower and upper bounds on the solution x. Nonlinear constraint function field 246 allows a user to specify equality or inequality non-linear constraints, if any. Derivatives field 248 allows a user to specify how the derivative for function specified in the nonlinear constraint function field 246 is computed or approximated. The user may choose to have the solver find the derivatives by choosing the "approximated by solver" option from the drop down list.

Although the illustrative GUI example in FIG. 2 uses MATLAB® computing environment notations/syntax for supplying certain fields in the problem section 216 and constraint section 224, a GUI widget may be provided that allows a user to type in equations using an equation editor or some other convenient to use interface to supply the objectives and/or constraints that describe the problem to be solved. The GUI widget or software 120 may then translate the equations typed in a different language to a language that selected solver in solver section 212 can interpret.

For each solver, a solver activation and result viewing section 226 may be provided to allow a user to start using the selected solver from solver section 212 to solve a problem setup in problem section 216 and view results from using the selected solver to solve the problem. The solver activation and result viewing section 226 may include a start button 228 that allows a user to activate/run the selected solver and solve the specified problem in problem section 216. A pause and resume button 230 and a stop button 232 may also be provided to allow a user to pause/resume or stop the problem solving process, respectively.

A save button or a save option, for example, in the file menu of window 202 may further be provided to allow a user to save a state of the problem solving process, either after the pause and resume button 230 or the stop button 232 is clicked by the user to pause or stop the problem solving process. The solver activation and result viewing section 226 further may include a current iteration field 316 that shows the current iteration the selected solver is in, a text field 236 that displays the results of using the selected solver to solve the specified problem, and a clear button 234 that clears results shown in the text field 236.

Pane 206 displays options that may be customized for a selected solver selected from solver section 212. Options are organized in different categories in pane 206. The categories may include stopping criteria 250, function value check 252, user-supplied derivatives 254, approximated derivatives 256, algorithm settings 258, multi-objective problem settings 260, inner iteration stopping criteria 262, plot functions 264, output function 266, and display to command window 268. Each category may have a control 270 that a user can click to expand or collapse options within the specific category.

Although the exemplary embodiments use specific options and categories in GUI 200, one of ordinary skill in the art will appreciate that the specific GUI options and categories illustrated should not be used to limit the scope of the present invention.

In one embodiment, dependencies may exist between different options so that if one option value is selected or provided, another option value may be automatically selected or provided as well. Alternatively, when one option value is selected or provided, another option or value of an option may be automatically disqualified as an additional option for the user to choose. In other words, there may be option values that may not be selected at the same time by a user.

Stopping criteria 250 determines the conditions under which the selected solver in solver selection 212 can stop operating on the problem specified in problem section 216. Function value check 252 provides an option for the user to have software 120 or solvers 124 examine the values returned by the user-specified objective function in objective function field 218 and/or the user-specified nonlinear constraint function in nonlinear constraint function field 246. If a user-specified function returns values that are invalid for the selected solver in solver selection 212, then an error is produced. Examples of invalid values may include NaN (i.e. not a number), Inf (i.e. infinite value), and complex values.

The user-supplied derivatives 254 provide options that are available to the user when a user provides a derivative for an objective function and/or a nonlinear constraint function. Approximated derivatives 256 provides options that are available when a derivative for an objective function and/or a nonlinear constraint function is approximated by the selected solver in solver selection 212.

Algorithm settings 258 provide options to control the behavior of an algorithm that is used by the selected solver in solver selection 212. Multiobjective problem settings 260 provide options for a user to supply additional specifications for multiobjective problems, such as the metric to be optimized. Inner iteration stopping criteria 262 provides options for a user to select stopping conditions for internal numerical procedures used by the selected solver in solver selection 212 to stop the iteration for a subproblem.

Plot functions 264 allow a user to select to plot various measures of progress of the selected solver from solver selection 212 that is used to operate on the problem specified in problem section 216. For example, measures of progress that may be plotted may include the current point (i.e. the best solution obtained by the solver so far), the number of objective function evaluations, the current point's objective function value, the current step size, and the current first-order optimality, etc. In one embodiment, a user may supply a custom plot function that the user has written or obtained to be used to provide a measure of progress of the selected solver. In one embodiment, one or more plots that are selected in the plot functions 264 may be plotted while the selected solver is running.

Output function 266 provides a user an option to specify an output function that the selected solver from solver selection 212 calls for every iteration in solving a problem specified in problem section 216. Alternatively, the user may specify that the output function runs periodically, such as every 2 iterations, every 3 iterations, every 5 iterations, etc. In one embodiment, an output function specified in output function 266 outputs data while the selected solver is running. The output function may be a user-defined function that a user has written or a user-selected function that a user selects from a list of available functions. For example, display to command window 268 provides a user a selection of different information that the user can request to display in a command window.

In another embodiment, when an invalid value is obtained for an option, such as when max iterations 272 obtains a custom number with a negative value, a user input may be requested for a valid value so that the chosen solver may be used. In another embodiment, a user may choose to change a value for an option, such as max iterations 272, max function evaluations 274, etc., while the chosen solver is running. In one embodiment, the user may change the value for an option in the GUI 200. Alternatively, the user may change the value using a control in a plot that is associated with the chosen solver. The plot may be one that is specified in plot functions 264.

One of ordinary skill in the art will appreciate that depending on the solver selected in solver section 212, the options available to each solver in pane 206 may be different. Unavailable options may not be displayed, or it may be displayed in a manner that does not give a user the ability to make a selection of the unavailable option. For example, in FIG. 2, unavailable stopping criteria options under stopping criteria 270 are displayed in a shaded manner that does not give a user the ability to make a selection of the unavailable options.

Pane 208 displays useful references and/or help topics regarding the use of the selected solver (in this case, fmincon solver) in solver section 212. Pane 208 may include a description/definition section 286 that describes the selected solver (in this case the fmincon solver), a problem setup section 288 that describes how a problem can be setup in pane 204, and an options section 290 that lists the different categories of options available to the selected solver and the description of each option under each category. Pane 208 may also include a more information section 340 (see FIG. 3) that includes additional references or help topics that may be useful to a user, such as topics in the documentation on optimization tool chapter 334 and function equivalent 336.

Each section in pane 208 may have one or more subsections, the details of which can be viewed by selecting the desired subsection(s). Problem setup section 288 may include a solver and algorithm subsection 292 that provides information related to the selected solver (in this case fmincon solver) and any available algorithms in solver section 212. Problem setup section 288 may also include a function to minimize subsection 294 that provides information related to problem section 216, where the information can assist a user to determine how to properly setup a problem in problem section 216. The problem setup section 288 may also include a constraints subsection 296 that includes information related to constraints 224 in pane 204 and a solver activation and result viewing subsection 300 that includes information related to solver activation and result viewing section 226 in pane 204.

Options section 290 includes subsections that correspond to available solver option categories in pane 206. The subsections include stopping criteria subsection 302 that may include information related to stopping criteria category 250, function value check subsection 318 that includes information related to function value check category 252, user supplied derivatives subsection 326 that includes information related to user-supplied derivatives category 254, approximated derivatives subsection 328 that includes information related to approximated derivatives category 256, algorithm settings subsection 330 that includes information related to algorithm settings category 258, inner iteration stopping criteria subsection 332 that includes information related to inner iteration stopping criteria category 262, etc.

Each subsection may include a description of the kind of options under the subsection, such as description 304 for stopping criteria subsection 302. Pane 208 may not display references or help topics that are not relevant to selected solver in section 212. For example, for fmincon solver, there are no available option(s) in multi-objective problem setting category 260, hence there is no subsection that corresponds to the multi-objective problem setting category 260 under options section 290 in pane 208.

In another example, stopping criteria category 250 in pane 206 displays that fmincon solver has an option for max iterations 272, max function evaluation 274, x tolerance 276, function tolerance 278, and nonlinear constraint tolerance 280. The options for max nodes 282 and time limit 284 are shaded to indicate that these options are not available to the fmincon solver. Alternatively, the options that are not available to a selected solver may not be displayed in GUI 200. In one embodiment, under subsection stopping criteria 302 in pane 208, descriptions are only listed for available options under the stopping criteria category 250. In this case, descriptions 306, 308, 310, 312, and 314 are provided for available options max iteration 272, max function evaluation 274, x tolerance 276, function tolerance 278, and nonlinear constraint tolerance 280, respectively.

In one embodiment, the GUI 200 may be implemented using a style sheet. A user may further be allowed to customize a layout of the contents or rearrange the contents in GUI 200 to a format that the user desires by providing to GUI 200 a configuration preference. The layout of the contents may include an order of the contents, and/or a grouping of the contents. In another embodiment of the present invention, a user may save a custom arrangement of contents or one or more settings in pane 204 and/or pane 206 by a save option in, for example, the file menu of window 202. The GUI 200 may then automatically load the custom arrangement or setting(s) in window 202 when the user next uses GUI 200 or provide a customized solver selection in the solver section 212 to allow the user to choose a saved custom arrangement or settings(s).

In still another embodiment, an export option may be provided, for example, in the file menu of window 202 that allows the problem to be solved by a selected solver to be exported to a desired format, such as a MATLAB format, a LATEX format, a PDF format, a postscript format, a web format, such as, HTML, XML, JavaScript, Ajax, Scalable Vector Graphics (SVG), etc., or a symbolic math format.

In still another embodiment, an export option may be provided, for example, in the file menu of window 202 that allows the problem to be solved by a selected solver along with the values chosen for the options in the options pane 206 and the call to the selected solver to be exported to a desired format, such as a MATLAB® computing environment format.

In yet another embodiment, an import option may be provided, for example, in the file menu of window 202 that allows a problem, data, and/or option settings to be imported so that GUI 200 may be used to choose a solver to solve the problem or manipulate the data.

In one embodiment, controls for selecting a solver, setting up a problem, displaying results, and selecting solver options are all displayed in one window so that a user does not need to switch between different windows to select a solver, setup a problem, view results, and review solver options. Additionally, the references and/or help topics in pane 208 may be tailored to the specific solver selected so that a user does not need to browse through a general reference or general help topic to find the specific reference or specific help topic. Furthermore, GUI 200 is able to update its content to reflect only those that are relevant to the presently selected solver. Although the illustrative embodiment uses specific GUI widgets in GUI 200, one of ordinary skill in the art will appreciate that the specific GUI widgets illustrated should not be used to limit the scope of the present invention.

Figure 3:
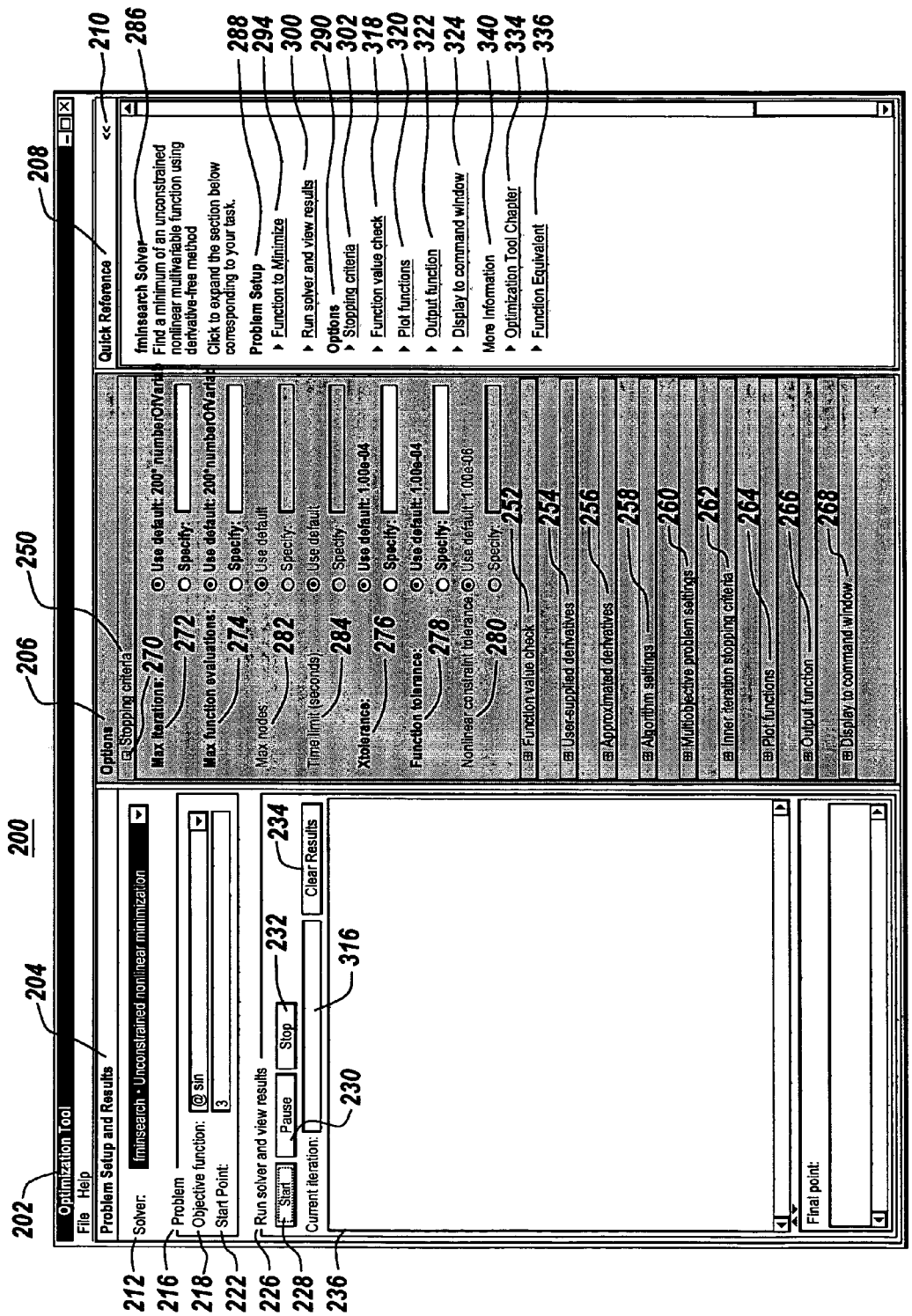
FIG. 3 illustrates how the exemplary graphical user interface changes its content according to the chosen solver.

FIG. 3 illustrates how GUI 200 may change as a different solver is selected in solver section 212. In FIG. 3, a solver called fminsearch is selected instead of fmincon solver in solver section 212. The fminsearch solver does not provide a choice in selecting an algorithm and hence does not have an algorithm field 214 such as shown in FIG. 2. Problem section 216 only has objective function field 218 and start point field 222. Constraints do not apply or are not available to fminsearch solver and hence pane 204 does not have a constraint section 224 such as shown in FIG. 2. Accordingly, pane 208 reflects fewer settings and options for the fminsearch solver and only displays those that are relevant and available to fminsearch solver. Specifically, under problem setup section 288, there are only two subsections: function to minimize subsection 294 and solver activation and result viewing subsection 300.

Additionally, under options section 290, only stopping criteria subsection 302, function value check subsection 318, plot function subsection 320, output function subsection 322, and display to command window subsection 324 are displayed, reflecting that they are the only available options under the corresponding categories (i.e., stopping criteria category 250, function value check category 252, plot functions category 264, output function category 266, display to command window category 268) in pane 206.

Under stopping categories 250, fminsearch solver has an option for max iterations 272, max function evaluations 274, x tolerance 276, and function tolerance 278. The options for max nodes 282, time limit 284, and constraint tolerance 280 are shaded to indicate that these options are not available to the fminsearch solver. In contrast, fmincon solver has an option for constraint tolerance 280. In one embodiment, options that are not available to a newly selected solver may be shaded or not displayed when a user switches to the newly selected solver.

Additionally, although both the fmincon solver and the fminsearch solver have an option for max iterations 272, max function evaluations 274, x tolerance 276, and function tolerance 278, the default value for these options may be different. Hence, options that are available for different solvers may not have the same default values. However, it is possible that the options that are available for different solvers may have the same default values. Alternatively, it is also possible that some options have the same default values and some options have different default values.

Assuming that the fmincon solver was selected initially by a user and relevant information in the problem section 216 in pane 204 has been entered by the user before the user changes his/her mind and switches to the fminsearch solver, the information that still applies to fminsearch solver may be maintained so that the user does not need to reenter the information again.

For example, the user has entered or chosen "@ sin", "Approximated by solver", "3" for the objective function field 218, derivatives field 220, and start point field 222, respectively while the fmincon solver is selected in solver section 212 before the user switches to the fminsearch solver. After switching to the fminsearch solver, the problem section 216 still has objective function field 218 and start point 222, and the information "@ sin" and "3" may be maintained in these available fields so that a user does not need to reenter the information. Information entered in the problem section 216 is not the only part that may be maintained and other information in other sections may also be maintained when a user switches solvers.

Although the exemplary embodiments use options, categories, problem setup/problem specifications available to the fminsearch solver and the fmincon solver, one of ordinary skill in the art will appreciate that the present invention applies to other solvers and is not limited to the fminsearch solver and the fmincon solver.

Alternatively, a preference may be provided to the user such that information entered in GUI 200 is not remembered so that when a user switches solvers, the default value/option is displayed. In one embodiment, when a user switches solvers, no value is automatically displayed or no option is automatically selected in the GUI 200.

Figure 4:
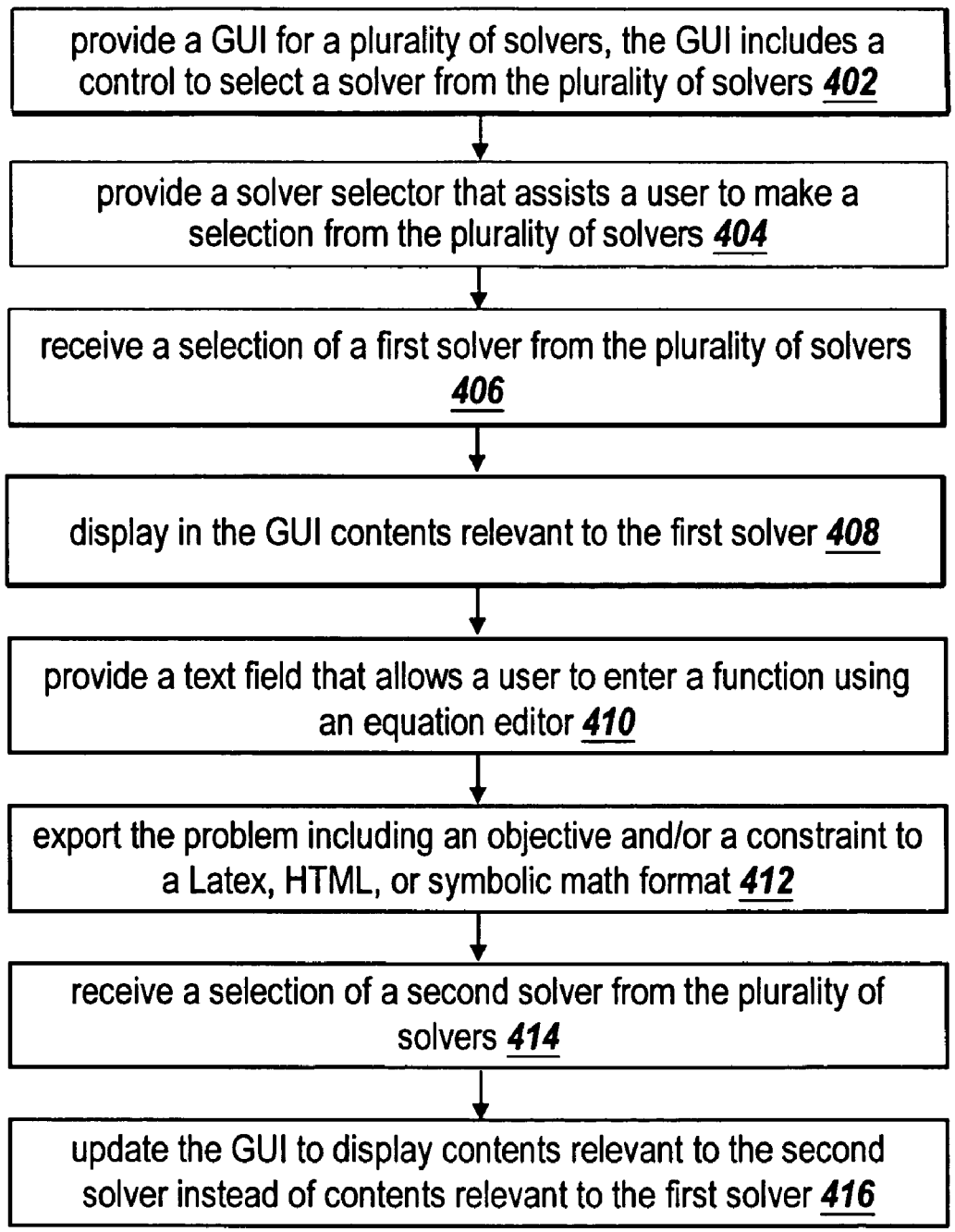
FIG. 4 illustrates a flowchart depicting steps taken to practice one embodiment of the present invention.

FIG. 4 illustrates a flowchart depicting steps taken to practice one embodiment of the present invention. In step 402, a GUI is provided in a window for multiple solvers, where the GUI includes a control to select a solver from the multiple solvers. The solvers can be any mathematical solvers, for example, optimization solvers. A solver selector may be optionally provided in step 404 to assist a user to make a solver selection among the multiple solvers. In step 406, a selection of a first solver from the multiple solvers is received by software 120. The selection may be made by a user from a list of solvers in a drop-down list or other GUI widgets.

Contents that are relevant to the first solver are then displayed in the GUI in step 408. The GUI may include a first pane to display a problem setup and view results and a second pane to display solver options. The first pane and second pane may be vertical panes that are displayed side by side. A button may be provided on the window to hide one or more panes. A user may also customize the arrangement of contents in the pane or GUI. The user may also customize settings. The panes may also be windows that may be docked and undocked in a container window.

Still referring to FIG. 4, in step 410, a text field or other GUI control may be provided that allows a user to enter a function using an equation editor or other easy to use interface for entering a function. In step 412, the problem including the objective and/or constraint may be exported to a desired format, such as a MATLAB, PDF, LATEX, HTML, XML, or symbolic math format. In step 414, a selection of a second solver from the multiple solvers may be received.

The GUI is updated in step 416 to display contents relevant to the second solver instead of contents relevant to the first solver. At least one element of the contents relevant to the second solver may not be relevant to the first solver or vice versa. The first solver and the second solver may have the same solver option but with a different default value. The GUI may further include a help pane that provides references related to selected solver and as the selected solver is changed, the help pane may also update and display references that are related to the newly selected solver.

Figure 5A:
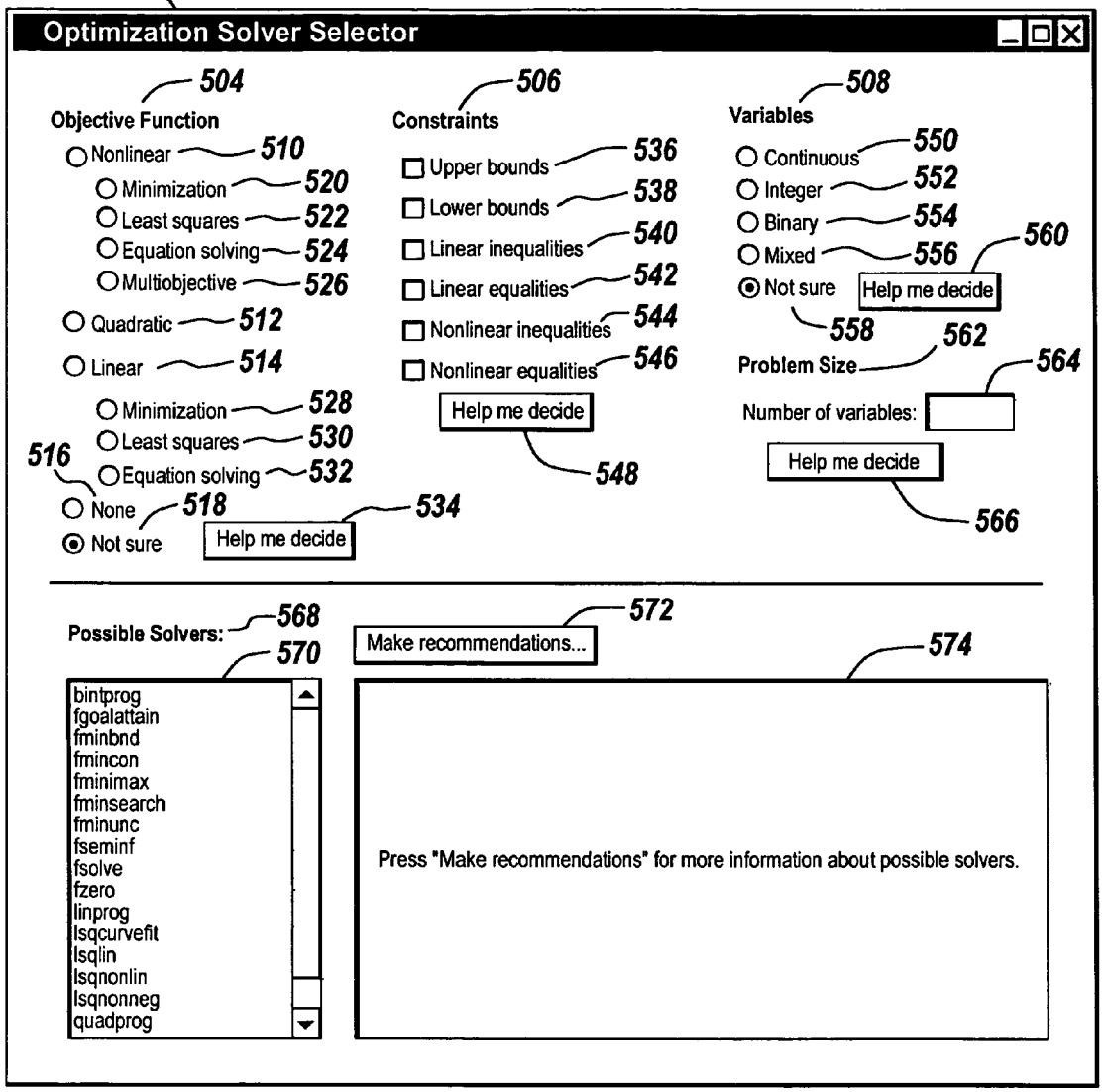
FIG. 5A depicts an exemplary graphical user interface for a solver selector that may be used to guide a user to choose a solver.

FIG. 5A depicts an exemplary graphical user interface 500 for a solver selector 126 that may be used to guide a user to choose a solver provided by solvers 124. GUI 500 is contained within window 502. GUI 500 includes an objective function section 504, a constraints section 506, a variables section 508, a problem size section 562 and a possible solvers section 568. The objective function section 504 allows a user to choose the type of objective function that the user plans to use. The user may choose nonlinear option 510, quadratic option 512, linear option 514, none 516, or not sure option 518. For the nonlinear option 510, a user may further specify what kind of nonlinear function the objective function is. As shown in FIG. 5A, the nonlinear option 510 may have four suboptions: minimization 520, least squares 522, equation solving 524, and multiobjective 526. For the linear option 514, there may be three suboptions: minimization 528, least squares 530, equation solving 532.

One of ordinary skill in the art will appreciate that the options illustrated in FIG. 5A is merely exemplary and these exemplary options should not be used to limit the scope of the present invention. At the end of the objective function section, a help me decide button 534 may be provided so that if a user cannot determine what type of objective function he/she is planning to provide, then more detailed explanations can be provided to help the user to make a selection of the type of objective function. Alternatively, the help me decide button 534 may also allow a user to provide the objective function and the solver selector 126 may analyze or parse the objective function to determine a type of the objective function. One of ordinary skill in the art will appreciate that there are many ways that a solver selector may help a user to determine a type of an objective function.

The constraints section 506 may provide options for a user to tell the solver selector 126 what kind of constraints there are in a problem that the user would like to use a solver from solvers 124 to solve. The kinds of constraints may include upper bounds 536, lower bounds 538, linear inequalities 540, linear equalities 542, nonlinear inequalities 544, and nonlinear equalities 546. The constraints section 506 may also include a help me decide button 548 for a user to choose to have the solver selector 126 provide more information to help the user decide which kinds of constraints exists in his/her problem.

One of ordinary skill in the art will appreciate that the kinds of constraints illustrated in FIG. 5A are merely exemplary and should not be used to limit the scope of the present invention. Alternatively, the help me decide button 548 may also allow a user to provide the constraints in some mathematical format and the second GUI 126 may analyze or parse the constraints to determine the types of the constraints. One of ordinary skill in the art will also appreciate that there are many ways that a solver selector may help a user to determine the kinds of constraints needed in a problem and the examples mentioned herein should not be used to limit the scope of the present invention.

The variable section 508 provides options for a user to tell the solver selector 126 what kind of variables are used in the problem that the user wishes to use a solver in solvers 124 to solve. In FIG. 5A, variable section 508 includes five options for a user to choose: continuous 550, integer 552, binary 554, mixed 556, and not sure 558. A help me decide button 560 is also provided in the variable section 508 to help a user to determine what kind of variables are used in the user's problem. The help me decide button can provide examples or further information that can help a user make a decision. One of ordinary skill in the art will appreciate that there are many ways that a solver selector may help a user to determine the kinds of variables used in a problem and the examples mentioned herein should not be used to limit the scope of the present invention.

The problem size section 562 allows a user to specify in text field 564 the number of variables that are used in his/her problem. A help me decide button 566 may be provided in the problem size section 562 to provide additional information that can help a user decide the number of variables that are used in the problem. One of ordinary skill in the art will appreciate that there are many ways that a solver selector may help a user to determine the number of variables used in a problem and the examples mentioned herein should not be used to limit the scope of the present invention.

In the possible solvers section 568, a list of possible solvers are displayed in field 570 according to selections and information that are supplied by the user in objective function section 504, constraints section 506, variables section 508, and problem size section 562. In FIG. 5A, not sure option 518 in the objective function section 504 and not sure option 558 in the variables section 508 are the only information supplied to the solver selector 126, hence all the possible solvers are displayed in the field 570 of the possible solvers section 568. A user can click on the make recommendations button 572 for more information about the possible solvers. When the make recommendations button 572 is pressed, then the information may be displayed in field 574.

Figure 5B:
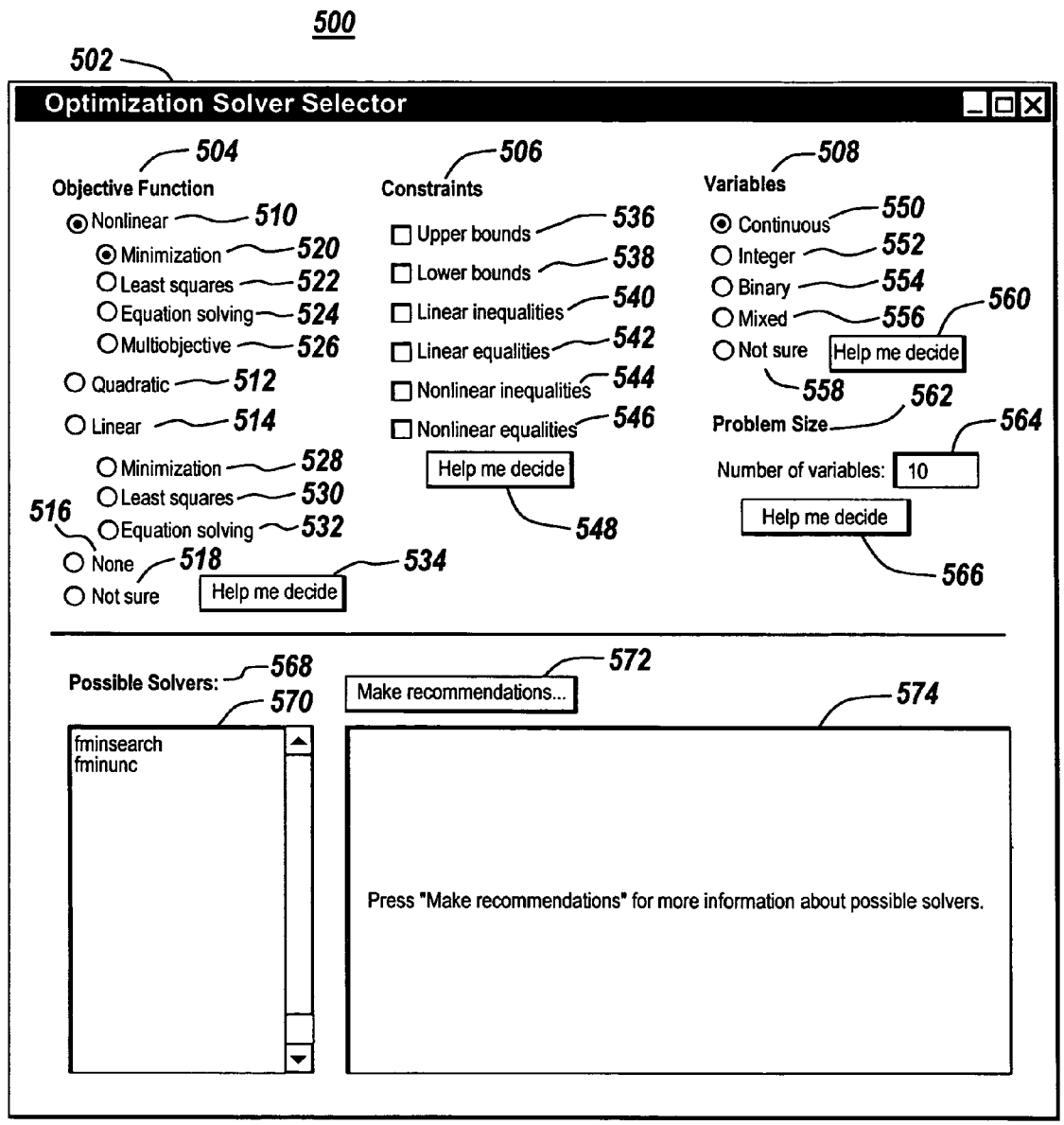
FIG. 5B depicts how the solver selector narrows down the possible solvers according to user selection in the exemplary graphical user interface in FIG. 5A.

In FIG. 5B, a nonlinear option 510 and the corresponding minimization suboption 520 has been chosen under the objective function 504. A selection of the continuous option 550 under the variables section 508 is also made. A number "10" is entered as the number of variables in field 564 under the problem size section 562. This causes the solver selector 126 to go through all the solvers in solver 124 and display only the possible solvers in field 570. In this case, field 570 displays fminsearch solver and fminunc solver. If the make recommendations button 572 is pressed, then additional information on each of the possible solvers are displayed in field 574, such as shown in FIG. 5C.

Figure 5C:
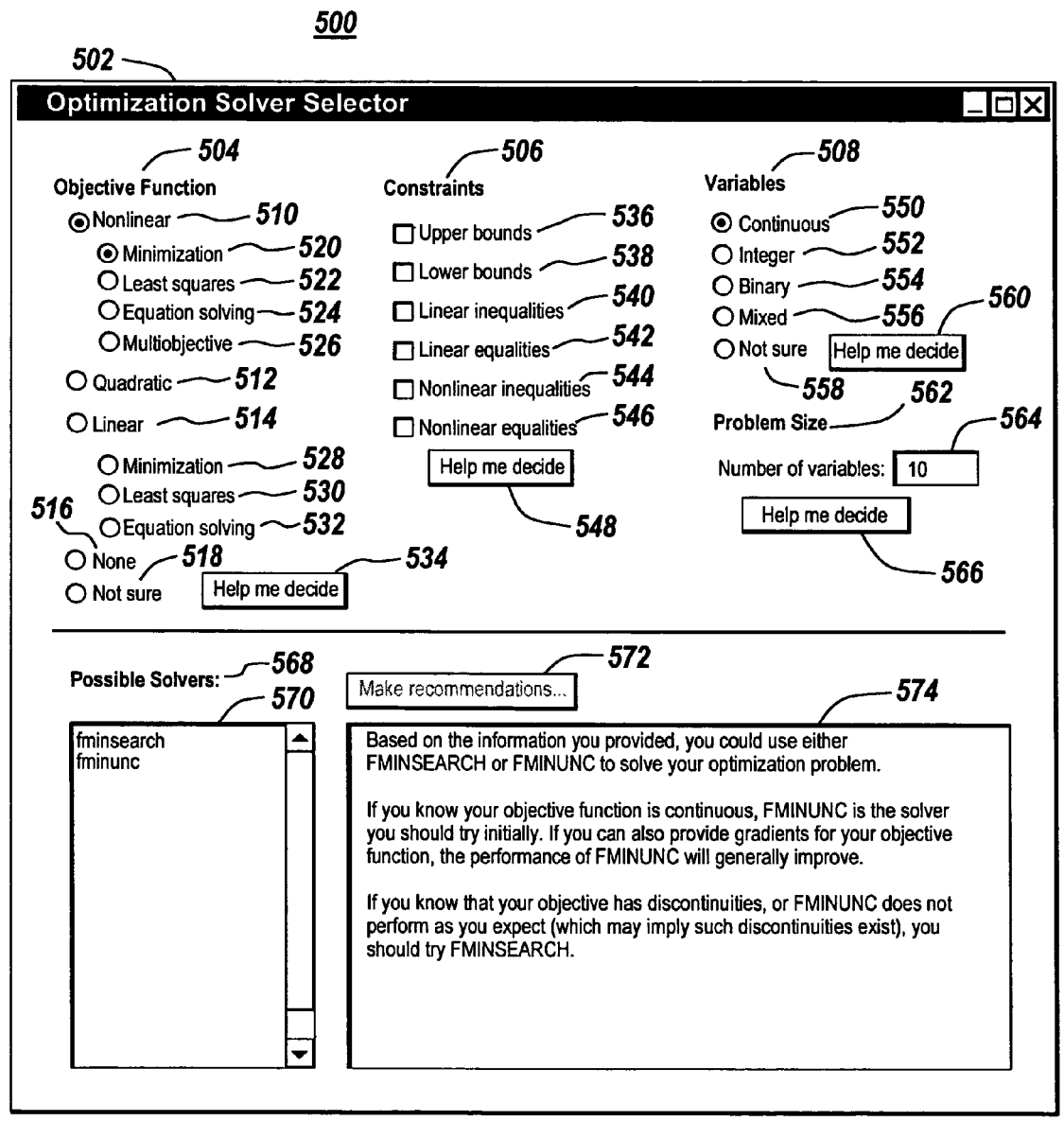
FIG. 5C depicts how the solver selector may make recommendations on which solver the user should select based on the selections made in the exemplary graphical user interface in FIG. 5B.

FIG. 5C depicts how the solver selector 126 may make recommendations on which solver the user should select based on the selections made in FIG. 5B. FIG. 5C shows that in field 574, the solver selector 126 describes how the user should choose a solver from the possible solvers obtained from the information provided to the solver selector 126. Additionally, the solver selector 126 may make recommendations in field 574 on options that can be used in conjunction with the solvers recommended. One of ordinary skill in the art will appreciate that although the illustrated GUI for the solver selector 126 contains specific GUI widgets, the present invention is not limited to the illustrated GUI in FIGS. 5A-5C, and other types of GUI widgets may be used for solver selector 126. Although FIGS. 2-3 and 5A-C are illustrated with respect to optimization solvers, the present invention is not limited to optimization solvers and can be applied to other mathematical solvers.

Exemplary implementations may allow for concurrently displaying a solver and its corresponding options in a primary GUI.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while a series of acts has been described with regard to FIG. 4, the order of the acts may be modified in other implementations consistent with the principles of the invention. Further, non-dependent acts may be performed in parallel.

In addition, implementations consistent with principles of the invention can be implemented using devices and configurations other than those illustrated in the figures and described in the specification without departing from the spirit of the invention. Devices and/or components may be added and/or removed from the implementations of FIGS. 1-2 depending on specific deployments and/or applications. Further, disclosed implementations may not be limited to any specific combination of hardware and/or software.

Further, certain portions of the invention may be implemented as "logic" that performs one or more functions. This logic may include hardware, such as hardwired logic, an application-specific integrated circuit, a field programmable gate array, a microprocessor, software, wetware, or a combination of hardware and software.

No element, act, or instruction used in the description of the invention should be construed as critical or essential to the invention unless explicitly described as such. Also, as used herein, the article "a" is intended to include one or more items. Further, the phrase "based on," as used herein is intended to mean "based, at least in part, on" unless explicitly stated otherwise.

The scope of the invention is defined by the claims and their equivalents.

We claim:

1. A computing device-implemented method of providing a graphical user interface (GUI) for a plurality of optimization solvers, said method comprising:
providing the GUI for a plurality of optimization solvers, the GUI including a control to select a solver from the plurality of optimization solvers to solve an optimization problem, a section for a user to provide information to identify what solver should be used by the user and a recommendation GUI element for a user to request a recommendation of which of the optimization solvers to use to solve the problem;
receiving information via the section of the GUI to identify what solver should be used by the user to solve the optimization problem; and
in response to a user interaction with the recommendation GUI element, displaying in the GUI on a display device a recommendation of which of the optimization solvers to use in view of the received information.

2. The method of claim 1, further comprising:
receiving a selection of a first solver from the plurality of optimization solvers; and
displaying in the GUI on the display device contents tailored to the first solver, the GUI contents including an objective function for the optimization problem wherein the objective function is an expression in an array-based language.

3. The method of claim 2, wherein the contents tailored to the first solver is simultaneously visible as the control to select a solver.

4. The method of claim 3, wherein the contents tailored to the first solver and the control to select a solver are displayed in one window.

5. The method of claim 2, wherein the contents tailored to the first solver includes problem specification fields or options related to the first solver.

6. The method of claim 5, further comprising:
obtaining a selection of a first value of a first one of the options; and
automatically selecting or disqualifying a second value of a second one of the options.

7. The method of claim 5, further comprising:
obtaining a selection of a first value of a first one of the options; and
automatically selecting or disqualifying a second one of the options.

8. The method of claim 5, further comprising:
obtaining a selection of a first value of a first one of the options;
running the first solver; and
replacing the first value with a second value while the first solver is running.

9. The method of claim 8, wherein the replacement of the first value with the second value occurred in the GUI.

10. The method of claim 8, further comprising:
displaying a plot associated with the first solver, wherein the replacement of the first value with the second value occurred in the plot.

11. The method of claim 5, further comprising:
obtaining an invalid value for one of the problem specification fields or one of the options related to the first solver; and
requesting user input for a valid value for the one of the problem specification fields or the one of the options related to the first solver.

12. The method of claim 2, further comprising:
receiving a selection of a second solver from the plurality of optimization solvers; and
updating the GUI to display contents relevant to the second solver instead of the contents relevant to the first solver.

13. The method of claim 12, wherein at least one of the contents relevant to the second solver is not relevant to the first solver or wherein the first solver has a solver option with a first default value and the second solver has the same solver option with a second default value.

14. The method of claim 13, further comprising:
receiving a preference determining if the second default value, no value, or a current value is shown for the solver option when switching to the second solver.

15. The method of claim 12, wherein the contents relevant to the first solver but not to the second solver are shaded or not displayed.

16. The method of claim 12, further comprising:
providing in the GUI a help pane or window that provides references related to the first solver when the first solver is selected and the help pane or window provides references related to the second solver instead of the references related to the first solver when the second solver is selected.

17. The method of claim 12, further comprising:
providing in the GUI a help window that provides references related to the first solver when the first solver is selected and the help window provides references related to the second solver instead of the references related to the first solver when the second solver is selected, wherein the help window can be docked to a container window or undocked from the container window.

18. The method of claim 1, further comprising:
providing a second graphical user interface for configuring the GUI for the plurality of optimization solvers.

19. The method of claim 1, wherein the first solver is implemented in an array-based computing environment.

20. The method of claim 1, wherein one or more licenses are provided with the plurality of optimization solvers to be used with the GUI.

21. The method of claim 1, further comprising:
providing a solver selector that assists a user to make a selection from the plurality of optimization solvers.

22. The method of claim 21, further comprising:
providing a widget to allow the solver selector to identify for the user a type of an objective function, a type of constraint, a type of variables, or a number of variables.

23. The method of claim 1, wherein the GUI includes a first pane to display a problem setup and view results and a second pane to display solver options.

24. The method of claim 1, wherein the GUI includes a window to display a problem setup and view results and a window to display solver options.

25. The method of claim 24, wherein the windows can be docked in a container window or undocked from the container window.

26. The method of claim 1, further comprising:
exporting a problem setup including an objective of a problem to be solved by the first solver to a LATEX, PDF, postscript, HTML, XML, JavaScript, SVG, or symbolic math format.

27. The method of claim 1, further comprising:
exporting a problem setup including a constraint of a problem to be solved by the first solver to a LATEX, PDF, postscript, HTML, XML, JavaScript, SVG, or symbolic math format.

28. The method of claim 1, further comprising:
providing a text field or other GUI widget that allows a user to enter a function using an equation editor for providing a problem setup including the problem to be solved by the first solver.

29. The method of claim 1, further comprising:
providing a user interface widget to expand or collapse a category of options related to the first solver.

30. The method of claim 1, further comprising:
providing a user interface widget in the GUI to run or stop the first solver.

31. The method of claim 30, further comprising:
providing a pause and resume button in the GUI to pause or resume the running of the first solver.

32. The method of claim 1, further comprising:
importing data or a problem into the GUI.

33. The method of claim 1, wherein the GUI is at least partially implemented in a JAVA programming language, a JavaScript programming language, an array-based programming language, an HTML language, or an XML language.

34. The method of claim 1, further comprising:
running the first solver; and
displaying a plot when the first solver is running to provide a measure of progress of the first solver.

35. The method of claim 1, further comprising:
running the first solver; and
outputting data when the first solver is running.

36. The method of claim 35, further comprising:
receiving a user-defined or user-selected function that determines what data to output when the first solver is running.

37. A medium storing executable instructions for causing a computing device to provide a graphical user interface (GUI) for a plurality of optimization solvers, the instructions include instruction for:
providing a GUI for the plurality of optimization solvers, the GUI including a control to select a solver from the plurality of optimization solvers to solve an optimization problem, a section for a user to provide information to identify what solver should be used by the user and a recommendation GUI element for a user to request a recommendation of which of the optimization solvers to use to solve the optimization problem;
receiving information via the section of the GUI to identify what solver should be used by the user to solve the optimization problem; and
displaying in the GUI on a display device a recommendation of which of the optimization solvers to use in view of the received information.

38. The medium of claim 37, further comprising:
receiving a selection of a first solver from the plurality of optimization solvers; and
displaying in the GUI on the display device contents tailored to the first solver, the GUI contents including an objective function for the optimization problem, wherein the objective function is an expression in an array-based language.

39. The medium of claim 38, further comprising instruction for:
obtaining a configuration preference regarding a layout of the contents tailored to the first solver in the GUI according to a user's preference.

40. The medium of claim 39, wherein the layout includes an order or a grouping of the contents.

41. The medium of claim 38, further comprising instruction for:
receiving a selection of a second solver from the plurality of optimization solvers; and
updating the GUI to display contents relevant to the second solver instead of contents relevant to the first solver.

42. The medium of claim 41, wherein at least one of the contents relevant to the second solver is not relevant to the first solver.

43. The medium of claim 41, wherein the first solver has a solver option with a first default value and the second solver has the same solver option with a second default value.

44. The medium of claim 41, further comprising instruction for:
providing in the GUI a help pane that provides references related to the first solver when the first solver is selected and the help pane provides references related to the second solver instead of the references related to the first solver when the second solver is selected.

45. The medium of claim 44, wherein the help pane can be closed or opened by a user selection.

46. The medium of claim 37, further comprising instruction for:
providing a second graphical user interface for configuring the GUI for the plurality of optimization solvers.

47. The medium of claim 37, further comprising instruction for:
providing a solver selector that assists a user to make a selection from the plurality of optimization solvers.

48. The medium of claim 37, wherein the GUI includes a first pane to display a problem setup and view results and a second pane to display solver options.

49. The medium of claim 37, further comprising instruction for:
exporting a problem setup including an objective of a problem to be solved by a first solver to a LATEX, PDF, postscript, HTML, XML, JavaScript, SVG, or symbolic math format.

50. The medium of claim 37, further comprising instruction for:
 exporting a problem setup including a constraint of a problem to be solved by a first solver to a LATEX, PDF, postscript, HTML, XML, JavaScript, SVG, or symbolic math format.

51. The medium of claim 37, further comprising instruction for:
 providing a text field that allows a user to enter a function using an equation editor for providing a problem setup including a problem to be solved by the first solver.

52. The medium of claim 37, further comprising instruction for:
 running the first solver; and
 displaying a plot when the first solver is running to provide a measure of progress of the first solver.

53. The medium of claim 52, wherein the plot is associated with a user defined function.

54. A computing device-implemented method of assisting a user to select a solver from a plurality of optimization solvers, said method comprising:
 obtaining information regarding a type of an objective function, a type of constraint, a type of variables, or a number of variables; and
 recommending a solver from the plurality of optimization solvers for the user to select; and
 based on the information, displaying at least one user interface element on a display device, said at least one user interface element being for the user to identify the type of the objective function, the type of constraint, the type of variables, or the number of variables.

55. A medium storing executable instructions for causing a computing device to assist a user to select a solver from a plurality of optimization solvers, the instructions include instructions for:
 obtaining information regarding a type of an objective function, a type of constraint, a type of variables, or a number of variables;
 recommending a solver from the plurality of optimization solvers for the user to select; and
 based on the information, displaying at least one user interface element on a display device, said at least one user interface element being for the user to identify the type of the objective function, the type of constraint, the type of variables, or the number of variables.

* * * * *